June 24, 1969     D. F. WILKES     3,452,175

ROLLER-BAND DEVICES

Filed May 29, 1967     Sheet 1 of 3

INVENTOR.
Donald F. Wilkes
BY

June 24, 1969  D. F. WILKES  3,452,175
ROLLER-BAND DEVICES
Filed May 29, 1967  Sheet 2 of 3
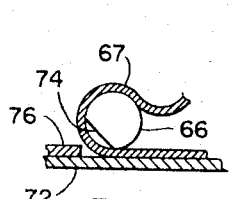
Fig. 5a
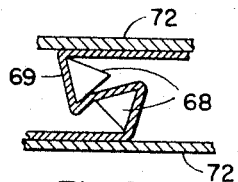
Fig. 5b
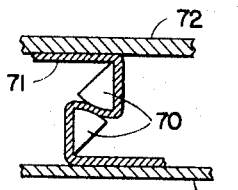
Fig. 5c
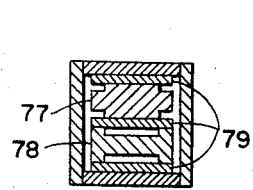
Fig. 5d
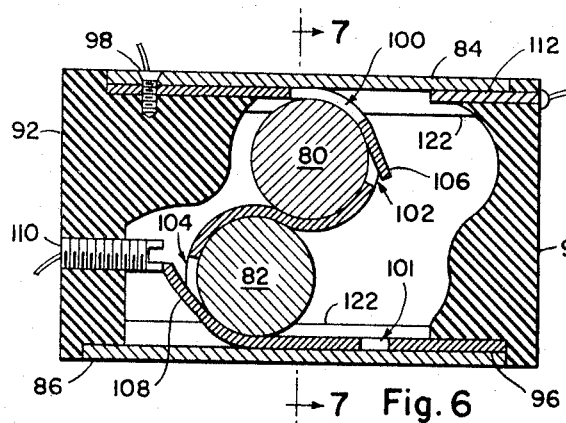
Fig. 6  Fig. 7
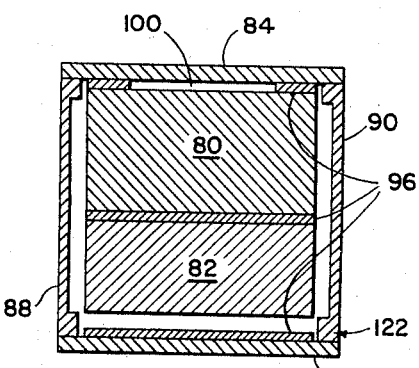
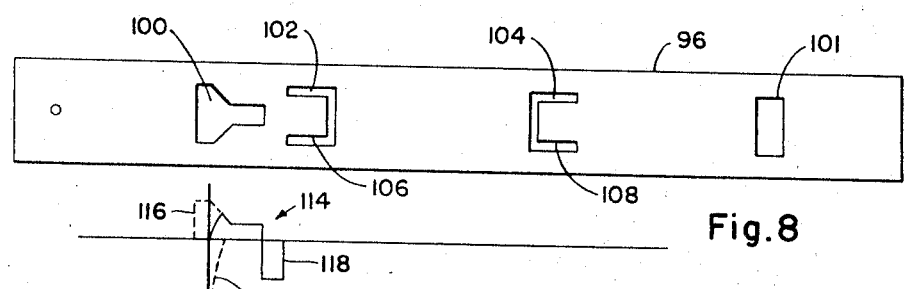
Fig. 8
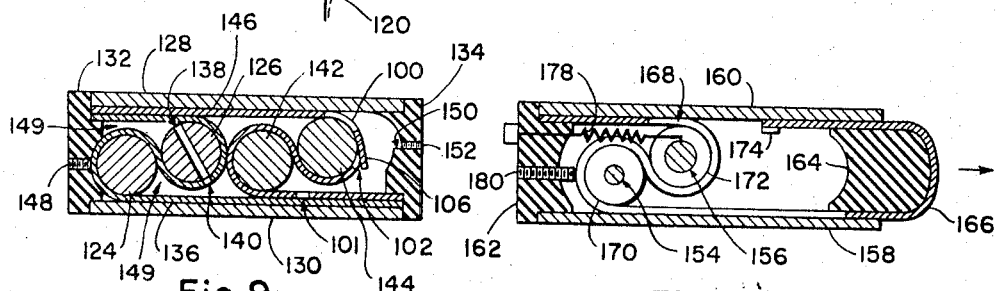
Fig. 9  Fig. 10
INVENTOR.
Donald F. Wilkes
BY

United States Patent Office 3,452,175
Patented June 24, 1969

3,452,175
ROLLER-BAND DEVICES
Donald F. Wilkes, Albuquerque, N. Mex., assignor to the United States of America as represented by the United States Atomic Energy Commission
Filed May 29, 1967, Ser. No. 643,314
Int. Cl. H01h 3/32, 35/24
U.S. Cl. 200—153         21 Claims

ABSTRACT OF THE DISCLOSURE

A roller-band device which substantially eliminates or minimizes sliding friction; the device having a plurality of rotatable members in a guideway with generally equidistantly spaced walls, with each wall supporting and restraining one of the rotatable members and separated from each other less than the summation of the diameters of the rotatable members, and a flexible band between the guideway walls having a portion disposed between the rotatable members at least partially encompassing at least one member, the band holding the members with generally parallel axes and providing rolling motion between each element of the device.

BACKGROUND OF INVENTION

In prior electro-mechanical and mechanical devices which transferred one form of motion or energy into another such as in bearings, gear systems, condition sensitive switches, etc., the accuracy, efficiency and sensitivity as well as the life of the devices have been limited by the degree or amount of sliding friction inherent in the device or sliding friction resulting from structural inaccuracies in the elements used in the device. In attempting to compensate or minimize sliding friction losses, compromises in construction are sometimes made which contribute further limiting factors in efficiency and sensitivity of the device under some operating conditions.

Attempts to minimize friction often resort to lubrication of the moving parts with various liquid, gaseous or solid lubricants. These lubricants may create forces which are detrimental to the operation of certain devices under highly sensitive operating conditions. The lubricant may contaminate critical areas within the housing or a portion thereof or require packing or sealing materials to prevent contamination and thus create other friction losses. Further, under extreme operating conditions such as high and low temperatures and prolonged storage, lubricants may not perform in the desired manner and may effect either partial or complete device failure.

The efficiency of land bearing surfaces has always been limited by the ability to fabricate precision surfaces or dimensions. For instance, in bearings such as roller-bearings, misalignment of rollers results in end frictional losses and attempts to provide closer alignment with caging frequently results in additional friction losses therebetween. If the losses adjacent roller ends can be minimized, surface roughness on the rollers may cause additional losses which may substantially exceed any attainable rolling coefficient of friction thus placing a lower limit on overall efficiency.

In devices such as accelerometers or G-switches, attempts to increase the accelerometer's sensitivity by decreasing sliding friction between the various elements of the device may also decrease the force applied between the electrical contacts closed by the devices reaction to an acceleration force since this force is generally dependent upon opposing sliding members. Further, such devices generally may not be adjusted to respond accurately to a relatively wide range of acceleration forces due to the unpredictable and variable frictional losses between the device's members.

Prior electrical potentiometers are also dependent and limited by sliding frictional forces between the contacts or contacts and resistance material. Any attempt to decrease the sliding frictional force to increase component life or sensitivity may result in a decrease in resistance linearity.

The problem became particularly acute in modern microminiaturized technology since the adverse effects of any friction may be greatly amplified relative to the size and forces available to activate the device. It has been shown that the friction force approaches a constant level for normal loading under about 10 grams which makes it hard to achieve a reasonable driving force to friction ratios in microminiature devices. Further, it is difficult to fabricate these devices so that they can perform multiple functions or provide a complex response to a predetermined or desired situation, environment or event. For instance, it may be desirable that a G-switch have one or more open or closed electrical contacts in its quiescent state, be accurately adjustable over a given range of acceleration force, be capable of sensing whether the acceleration force continued for at least a given period (and if not have automatic reset capabilities), be stable over long periods of time and over wide ranges of operating conditions, have one or more open or closed electrical contacts in its activated state, provide latching in its activated state and be relatively insensitive to load components not on the sensitive axis.

It is desirable in this area of technology that a mechanism or apparatus be capable of modular construction, e.g., that the mechanism be constructed of standardized parts which can be assembled to perform a wide range of functions depending on the particular parts used and the environment in which the device is used. Using a given module, a wide range of devices can be fabricated using mass production techniques to perform a wide range of functions without providing separate tooling and production facilities for each device. Such modular construction can provide commensurate per unit time and cost savings while permitting the facility to be converted in a minimum of time to the production of another modular device performing an entirely different function.

Sliding friction losses may be decreased by further precision fabrication, closer tolerances and the use of such sophisticated techniques such as air bearings. However, there is generally both a financial and a technology limit to these approaches and the devices become increasingly sensitive to environmental conditions such as temperature, moisture and surface contaminations such as with dirt or dust.

Since rolling coefficients of friction are considerably lower than sliding coefficient of friction, it is desirable to provide electro-mechanical or mechanical devices having only rolling friction losses. Rolling coefficients of friction have been measured as low as about .00001 to .00002 for right circular cylinders where as roller bearings and ball bearings have attained coefficients of friction of only about .001 to .005 due to the loss mechanism noted above and several others which have not been mentioned.

SUMMARY OF INVENTION

In view of the limitations of the prior art such as noted above, it is an object of this invention to provide mechanisms having substantially only pure rolling friction losses.

It is a further object of this invention to provide mechanisms exhibiting low coefficients of friction without use of lubricants.

It is a further object of this invention to provide mechanisms having substantially no adverse effects from surface deformities on load bearing surfaces.

It is a further object of this invention to provide electrical switch mechanisms having only rolling friction losses while having high contact pressures.

It is a further object of this invention to provide mechanisms which may have force biases applied thereto.

It is a further object of this invention to provide mechanisms having adjustable negative force bias with only pure rolling friction losses.

It is a further object of this invention to provide a substantially frictionless piston mechanism which may be displaced by or may displace fluids.

It is a further object of this invention to provide mechanical bearings having only rolling friction losses.

It is a further object of this invention to provide mechanisms having only rolling friction losses which are capable of modular construction.

The invention comprises a roller-band device having a guideway with oppositely spaced walls, at least a pair of rollers intermediate the guideway walls with combined cross-sectional dimension greater than the spacing between the walls, and a flexible band supported within the guideway and reversibly looped about the rollers so as to effect rolling movement of the rollers and band longitudinally along the guideway.

DESCRIPTION OF DRAWINGS

Embodiments of the present invention are shown in the accompanying drawings wherein:

FIG. 4a is a view of a tension band having electrical conductors embedded therein;

FIG. 4b is a cross-sectional view taken along line BB of FIG. 4a;

FIG. 5a through c is a side elevation view, partially in cross-section, of a portion of a roller-band device showing various rotatable member geometries;

FIG. 5d is a cross-sectional end view of a roller-band device having spool-shaped rotatable members;

FIG. 6 is a cross-sectional side view of a roller-band G-switch;

FIG. 7 is a cross-sectional view taken along line 7—7 of FIG. 6;

FIG. 8 is a view of the tension band shown in FIG. 6 and the force diagram of the tension band;

FIG. 9 is a cross-sectional side view of a roller-band device which may be used to sense or measure acceleration or velocity;

FIG. 10 is a side view, partially in cross-section, of a 2-level accelerometer G-switch;

DETAILED DESCRIPTION

Figure 1:
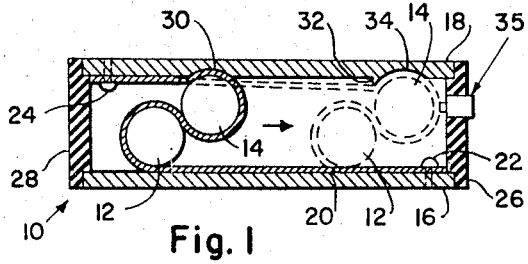
FIG. 1 is a side elevation view, partially in cross-section, of a roller-band device with generally parallel guideway walls and right circular cylinder rotatable members.

By way of introduction, the mechanism shown in FIG. 1 which may be referred to as a "roller-band" device illustrates various features and principles of this invention. As shown, roller-band device 10 includes a group or pair of adjacent rotatable members or rollers 12 and 14 supported between equidistantly spaced restraining surfaces or walls 16 and 18 of a guideway by a flexible, tensioned band or ribbon 20. Band 20 extends in generally S-shaped configuration partially around members 12 and 14 and may be held under tension by suitable fasteners 22 and 24, such as screws or bolts, which attach band end at opposite extremities of the guideway on opposing walls. The guideway walls 16 and 18 are supported at either end by end blocks or walls 26 and 28. The summation of the diameters of the rotatable members is at least slightly greater than the distance between walls 16 and 18 of the guideway.

In the embodiment illustrated in FIG. 1, rotatable members 12 and 14 may be right circular cylinders of any convenient length. Tension band 20 in this embodiment may be a flat elongated band of any convenient constant width and any convenient constant thickness. For purposes of illustration, tension band 20 is shown with exaggerated thickness since generally it may be from about .0002 to .004 inch thick for instrumentation usage. The guideway, which includes walls 16 and 18, may also include side walls (not shown) depending on the application of the invention.

As shown rotatable members 12 and 14 are in an initial position with member 14 and the corresponding contiguous portion of tension band 20 in latch or detent 30 in wall 18. If a predetermined force function is applied in the direction of the arrow (for example by acceleration of the device toward the left) which is sufficient to overcome the forces of tension band 20, inertia of members 12 and 14 and band 20, the coefficient of friction (e.g. rolling friction), and the band tension holding roller 14 in detent 30, member 14 may be released from the detent. If this force function or some lesser force (now only dependent on the band tension friction and inertial forces) continues, members 12 and 14 may continue to roll along the guideway until the force function is discontinued or members 14 reaches energy barrier 32. If sufficient force is applied over the travel of the rollers to raise the kinetic energy above some threshold provided by the combination of height and width of the barrier and the increased tension placed on tension band 20, the members may roll over barrier 32 and drop into latch or detent 34 as shown by the dashed representation of the rotatable members and tension band. In order to unlock the roller-band device in a reverse direction, a force would have to be applied in the opposite direction to overcome both detent 34 and barrier 32.

Roller-band device 10 may operate a switch contact or microswitch 35 or be provided with electrical contacts on the ends of either member 12 or 14 and on the appropriate side wall of the guideway, or tension band 20 can be used as an electrical contact and another contact provided within detent 34 in wall 18 so that an electrical circuit is completed when member 14 reaches detent 34. Thus, the roller-band device shown in FIG. 1 may be used to measure or sense a force or combination of forces and the integration of the forces over a given time determined by the length of the guideway. Such devices can be released from detent 30 and rolled over barrier 32 with an accuracy of plus or minus a fraction of a percent of predetermined force levels.

With the general construction and operation of the FIG. 1 type of device in mind, reference will now be made to the simplified roller-band device of FIG. 2 in order to explain more of the principles of the device. As in FIG. 1, roller-band device 42 includes a group or pair of adjacent rotatable members 44 and 46 supported between equidistantly spaced walls 48 and 50 of a guideway by a flexible tension band 52. Rotatable members 44 and 46 are shown in an initial position adjacent end wall 47, with the band 52 shown departing from contact with walls 48 and 50 at contact "lines" or lines of tangency 54 and 56.

As the band 52 is looped or threaded around members 44 and 46 and fastened under tension by suitable means to diagonally opposite ends of walls 48 and 50 of the guideway, the band tension produces a torque which urges the rotatable members firmly toward their respective restraining walls 48 and 50 and holds their axes parallel to each other, the combined effect of band tension and restraining walls being to urge the rollers firmly toward each other. With the rollers in the noted initial relationship, the position of the contact lines or zones may be varied to an extent by changing the tension of the band.

By way of explanation, it appears that the force (F) to effect movement of the rotatable members contributed by any one of the three rolling contact zones (at contact lines 54 and 56 and between rollers 44 and 46) is equal to the coefficient of rolling friction ($\mu$) times the applied normal force (N) at that zone induced by the tension band and inertial forces. At any one zone;

$$F = \mu N \tag{1}$$

so for the entire geometry, the total frictional force ($F_t$)

$$F_t = \mu_1 N_1 + \mu_2 N_2 + \mu_3 N_3 \tag{2}$$

The normal force (N) results from the tension applied to the band and the inertial forces of the system. Since the inertial forces of the rotatable members and band and the coefficient of friction are relatively small, the tension applied to the band may be the primary variable used to control or predict (F).

Since the tension band 52 is shown bent around a portion of each member 44 and 46 in opposite directions, energy stored elastically in the S-shaped part of the band applies opposite resultant forces which emanate from the axes of each rotatable member, likewise the axial components of these forces $F_b$ in opposition in the direction of each band parallel to the guideway walls at each contact line or zone as defined by the following formula where force is measured at the center of one or the other where:

$$F_b = WEh^3/12R^2 \tag{3}$$

where
W = width of band at line contact,
E = modules of elasticity of band at line contact,
R = radius of rotatable member, and
h = thickness of band at line contact.

If the band parameters W, E and h are equal at both zone or line contacts 54 and 56 and the radius of the members are equal, the opposing forces ($F_b$) will be equal and the roller-band device will be in a state of equilibrium or rest in the absence of any external forces. The direction and magnitude of these forces are essentially independent of the band tension. Because one or more of the parameters of the band may be different at line contacts 54 and 56 (defined as positions 1 and 2 respectively);

$$F_{b1} \neq F_{b2} \tag{4}$$

resulting in an unbalanced force ($F_r$) being applied to the rotatable members. If for instance the force $F_{b2}$ is larger than the force $F_{b1}$, the force bias ($F_r$) will be applied to the rotatable members in the direction of the arrow. If the width (W) of the band is varied, the formula for the unbalanced force becomes;

$$F_r = (W_1 - W_2)Eh^3/12R^2 \tag{5}$$

The other variables, E, h and R, may be varied to apply a force bias to the rotatable members.

Axial forces may be introduced by employing a band with preset loops or curves. These loops or curves may be formed by conventional tempering or cold forming processes. Forces may also be introduced by varying the material longitudinally in the band by laminating or connecting together various materials along the band by conventional processes.

FIGS. 3a to 3l illustrate various tension band configurations which provide various band width combinations at the line contacts with the guideway walls showing the resulting force bias ($F_r$) applied to the tension band and consequently the rotatable members. The tension band configurations in FIGS. 3a to 3l will be applied to the roller-band device 42 shown in FIG. 2. It will be assumed, for purposes of illustration, that the vertical axis of the force diagram in each of the drawings crosses tension band 52 at contact line 56 adjacent member 46 and that a portion of band 52 which partially encompasses member 44 is contiguous with the end wall of roller-band device 42.

Figure 3A:
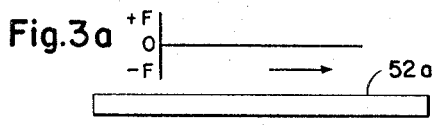
FIGS. 3a through 3l are diagrammatic views of tension band configurations and the resulting force biases.

In FIG. 3a, tension band 52a has a uniform width throughout its length. Since the width of the band at line contacts 54 and 56 are equal, the resulting force ($F_r$) is zero as shown in the force diagram. This is the same configuration described with reference to FIG. 1.

Figure 2:
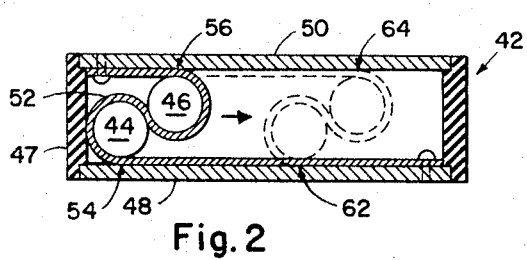
FIG. 2 is a side elevational view, partially in cross-section, of a roller-band device of the type shown in FIG. 1 but with uninterrupted guideway walls.
Figure 3B:
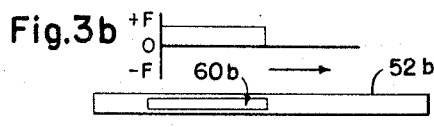

In FIG. 3b, tension band 52b has a rectangular cutout 60b which begins to the left of line contact 56 in FIG. 2 and continues around rotatable members 46 and 44, stopping just short of line contact 54. The distance of contact this represents is also the maximum travel the geometry can undergo without passing out of the force zone. Using Equation 5 above, cutout 60b generates a constant resulting force ($F_r$) in the opposite direction of the arrow in FIG. 2 (a positive force) for the time in which cutout 60b is adjacent the line contact 56. Using tension band 52b with the roller-band device 42 of FIG. 2, the roller-band device may be used to measure forces, such as acceleration forces, in the direction of the arrow and the period of the force. If a negative force which is greater than the force of the band cutout is applied to the roller-band device, the members and band may rotate along the guideway for the duration of the force. If the force continues for a time sufficient to allow the members to move to a second position having line contacts 62 and 64 as shown by the dashed lines in FIG. 2 which are beyond the cutout, the resulting force bias on the tension band will be zero and the tension band will be in a state of equilibrium. If the force does not continue for a sufficient time to allow the members and tension band to reach line contacts 62 and 64, the force bias will cause the members and tension band to return to its initial position against the end wall.

Roller-band device 42 with tension band 52b may also be used as a condition sensing switch by positioning the rotatable members and band to the right of line contact 56 with cutout 60b still adjacent to the line cutout and physically holding the members in that position by a condition sensing means such as a fusable material or a releasable magnetic latch (not shown). Should the desired condition occur, the condition sensing means may release the members and allow them to return under the tension band force bias to the end wall of the device and thus energize a switch (not shown). Such a device may be used, for example, as a circuit breaker or a circuit fault sensor.

Figure 3C:
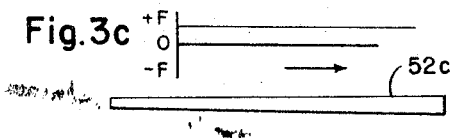

In FIG. 3c, tension band 52c is tapered at a uniform rate throughout the entire length of the band. Since the difference in width of the tension band at the line contacts for each rotatable member will be the same along the entire length of the guideway, the resulting force ($F_r$) is constant. The tapered band force is not limited by the length of the contact of the band with the rollers as is cutout 60b in FIG. 3b. Using mechanical latching such as that shown in FIG. 1 and the concepts described with reference to FIG. 3b roller-band device 42, having tension band 52c, may perform the same functions as tension band 52b.

It will be apparent that tension band 52c may have a uniform width and a uniformly tapered cutout throughout its length to provide the same force bias.

Figure 3D:
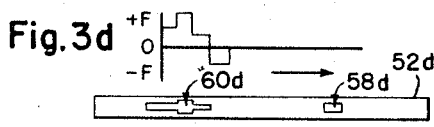

In FIG. 3d, tension band 52d includes a complex cutout 60d, a portion of which may be adjacent line contact 56 in configuration shown in FIG. 2, and a second cutout 58d, which may be adjacent line contact 62 and member 44 as shown by the dashed lines in FIG. 2. Cutout 60d provides a similar positive force bias as cutout 60b in FIG. 3b except that the force bias has three force levels with step changes between each level. Cutout 58d provides a negative force bias which may function as a latch similar to mechanical detents or latches 30 and 34 in FIG. 1. The step function force bias generated by cutout 60d may perform the same function as mechanical detent 30 in FIG. 1.

Figure 3E:
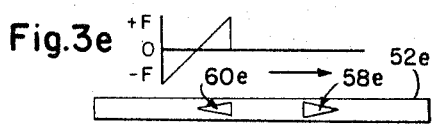

In FIG. 3e, tension band 52e includes a pair of triangular cutouts 58e and 60e. The base of triangular cutout 58e may be adjacent line contact 54 at one end of the force bias while the base of triangular cutout 60e may be adjacent line contact 64. The combined force bias generates a curve similar to a positive spring constant having a stable position where the force bias crosses the force diagram axis, e.g. where the apexes of the triangular cutouts are both simultaneously adjacent to a line contact about midway between line contacts 54 and 62 and 56 and 64 respectively. A roller-band device using tension band 52e may be used, for example, as a shock absorber or vibration damper.

Figure 3F:
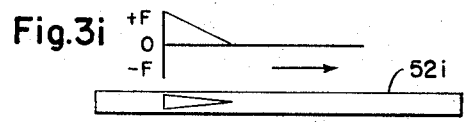

In FIG. 3f, tension band 52f includes a triangular cutout 60f having its apex adjacent to line contact 56. The resulting force bias, like FIG. 3e is similar to a positive spring constant exhibited by a helical spring.

Figure 3G:
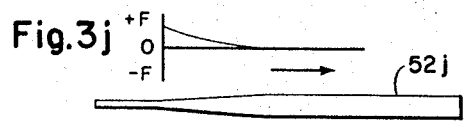

In FIG. 3g, the generally concave tapered band width configuration shown produces a parabolic shaped force bias, thus providing both a positive and negative spring constant type force curve.

Figure 3H:
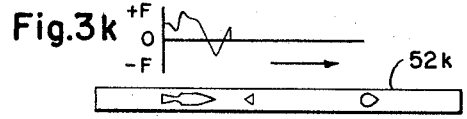
Figure 3I:
Figure 3J:

In FIGS. 3h, 3i and 3j, various cutouts and band width changes in tension bands 52h, 52i and 52j generate force biases which are similar to a negative spring constant force pattern. These cutouts and width changes operate on roller-band device 42 in the same manner as shown in FIGS. 3e, 3f and 3g and described above. By positioning the line contact of either tension band 52h, 52i or 52j adjacent rotatable member 46 along the force bias curve, a wide range of forces can be measured by roller-band device 42 using a single tension band geometry.

Figure 3K:

FIG. 3k illustrates an arbitrary force bias which may be generated by a tension band such as band 52k merely by selecting the force bias desired and then design an appropriate cutout or cutouts.

Figure 3L:

In FIG. 3l, the two series of circular cutouts in tension band 52l generate a generally sinusoidal force bias. Such a force bias may be used to provide multiple stable or detent positions for rotatable members 44 and 46.

By chosing one or more of the cutout or band width configurations illustrated in FIGS. 3a to 3l or variations and combinations thereof, any desired force bias may be generated with roller-band device 42. There are some applications where it may be desirable to use a primary force biased or non-biased tension band and rotatable member pair in conjunction with one or more secondary tension bands with or without their own rotatable members having separate force biasing to obtain a desired composite force biasing. The additional secondary tension bands may act as a pusher or damping on the primary tension band. Another typical force bias will be illustrated in FIG. 8 which may be used in particular applications of the principles of this invention. For most applications it is preferable to provide the desired force biasing with cutouts rather than vary the outside dimension of the tension band since the cutouts can be formed more precisely with conventional techniques such as photographic etching processes.

The tension band may be made of a wide range of flexible materials or combinations thereof depending on the particular application of the roller-band device such as plastics, metals, alloys, laminates, insulators, viscoelastic materials, etc. Typical materials include aluminum, stainless stell, beryllium-copper-plastic laminates, polyethylene terephthalate (sold under the trademark "Mylar") and polyimides (sold under the trademark "Kapton"). In some applications it may be desirable to use a temperature sensitive bimetalic tension abnd which will generate or modify force biasing in response to temperature variations.

Figure 4:
Figure 4B:
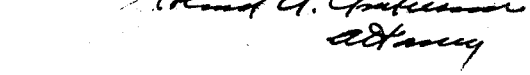

FIGS. 4a and 4b illustrate a tension band having multiple electrical conductors embedded therein. Tension band 34 includes a main body or portion 36 which may be made of a suitable solid or laminated insulating material. A pair of aligned conductors 38 and 40 and conductor 41 may be embedded in or laminated between the insulating material of portion 36. Any number of conductors, having any desired length, may be embedded within a tension band such as band 34 depending on the required electrical circuits or connections determined by the particular application of the device. (See the description of tension band 172 in FIG. 10.) If it is desired to make contact with either of conductors 38, 40 or 41 through the tension band walls, the insulating material of portion 36 may be removed or separate contacts fastened to the tension band at the point of desired contact.

In order to provide flexibility and shock resistance in the tension band itself so as to maintain the desired tension, ring or maze type cutouts or corrugations may be provided at the band ends or the band may be made of an elastic material.

The rotatable members or rollers may be any suitable hollow or solid cylindrical shape such as a right circular cylinder or right prism and variations thereof. In most applications, hollow or solid, right circular cylindrical, rotatable members may be used (see FIGS. 1, 10 and 13) since they provide a continuous rotating movement. The rollers may also be made with one or more spring biased members which may be urged outwardly against the side walls of the guideway to eliminate the need to precisely control roller lengths as is needed in some cases. Also, in some applications desired force patterns, detenting, latching, etc., may be obtained by using alternate or complex rotating member shapes. The rotatable members may also be formed in a spool shape as shown in FIGS. 5d and 10.

FIGS. 5a through 5c illustrate several typical roller-band device, rotatable members 66, 68 and 70, in addition to the right circular cylindrical type shown in FIGS. 1 and 2, all partially encompassed by tension bands 67, 69 and 71 and supported on guideway walls 72. Rotatable member 66 is generally a right circular cylinder having a flat portion 74. Rotatable members 68 have generally equilateral triangular polyhedron shapes while the members 70 have generally triangular polyhedron shapes with one curved portion 75. As member 66 rotates with its band onto a flat portion of the member, such as portion 74, the roller-band device assumes a generally stable position representing slightly decreased band tension and may function as a detent or latch until a sufficient force in either direction can rotate the member off the flat portion. Various combinations of detents and latches may be incorporated in the device with this technique. As can be seen in FIG. 5, flat portion 74 may provide additional compliance in the device depending on the band tension to remove the criticality in the tension setting procedure or provide shock absorbing ability.

A block 78 may be positioned on the inner wall surface of guideway wall 72 so that a rotatable member and tension band can be rotated over the same. As the rotatable member, such as member 66, rotates over block 78 the normal force (N) introduced by band tension, may be essentially recovered. If the block is actually two or more contact points the normal force may be shared equally among the contact points because of the compliance provided by the flat portion 74. The small amount of slipping induced by the slight reduction in radius at the flat portion serves to remove oxide films or contaminants and assure clean contacting. In flat portion 74 is positioned adjacent block 76, additional wiping may be provided between the contacts as well as a greater detenting or latching force or a repulsive force created depending on the relative positions of portion 74, block 76 and the center of member 66.

Where extreme sensitivity is required, complimentary spool-shaped rotatable members 77 and 78 may be used as shown in FIG. 5d. Members 77 and 78 are shaped so that the members do not have surfaces contacting opposing surfaces of tension band 79. The configuration shown tends to reduce or substantially eliminate the detrimental effects of any surface roughness on members 77 and 78. Surface roughness effects may also be substantially eliminated by either increasing the band tension to cause plastic deformation of the members and smooth out surface roughness or decreasing band tension so that the members ride on the peaks of surface roughness. Spool-shaped member 78 may also be used where it is desired to decrease the mass of the roller-band device and the resulting inertial forces.

The rotatable members may be made of a wide range of materials with or without coatings depending on the application of the roller-band device and any force bias contribution desired from the member. Typical materials which may be used are metals such as beryllium, aluminum, stainless steel, brass, beryllium-copper alloy and tungsten carbide or insulating materials such as aluminia, structural plastics and rubber.

The guideway or housing supporting or restraining walls may be made of any suitable material depending on the application of the roller-band device such as conventional insulating materials and metals or alloys. Where the tension band is used as an electrical conductor, the guideway may be coated with a layer of insulating material. The guideway tension band supporting walls can be provided with various detenting, latching, sears and electrical contacts as shown in FIGS. 1 and 5 to perform a wide range of functions with respect to the tension band and rotatable members. The guideway side walls may be provided with grooves or orifices to provide fluid damping in an enclosed roller-band device between opposite sides of the tension band and rotatable members. Further, the guideway side walls may be provided with sears, wedges, electrical contacts, magnetic actuated pin latches, etc., depending on the particular application of the roller-band device.

While roller supporting walls are shown in the drawings as generally equidistantly spaced from each other, either as flat parallel members or as flat arcuate members they may be of diverging or converging relationship with respect to each other, so long as the distance between them is at their effective operative portions not greater than the sum of the effective diameters of the rollers. In some specific applications requiring special or complex force bias functions, the guideway supporting walls may be defined as the surfaces generated by passing two parallel lines of equal length along two planar non-intersecting lines wherein said parallel lines are perpendicular to said plane.

The end walls may also include various latching and detenting mechanisms as well as adjusting screws for positioning or releasing the tension band and rotatable members in or from a force bias. The end walls may be made of any suitable material depending on the application of the roller-band device and function performed by the end wall.

Various modifications, forms and combinations of rotatable members, tension bands, and guideways and their associated mechanisms will be described hereinafter in connection with the following embodiments of the roller-band device.

FIGS. 6 and 7 illustrate the present invention in one form of a G-switch or accelerometer. A pair of adjacent rotatable members 80 and 82 are shown held under tension in an initial position between guideway supporting walls 84 and 86, sidewalls 88 and 90 and end walls 92 and 94 by tension band 96. Tension band 96 may be held under tension by suitable fastening means such as screw 98.

Tension band 96 includes a complex cutout 100 and a rectangular cutout 101. Cutout 100 is positioned as shown along the contact line of member 80 and tension band 96 with wall 84. Cutout 101 is positioned so that when member 80 and the band rotate past cutout 100, cutout 101 will be adjacent the contact line between member 82 and tension band 96 and wall 86 in the device's final position. Tension band 96 also includes a pair of oppositely facing U-shaped cutouts 102 and 104 leaving a pair of tongue-like extensions 106 and 108 intermediate the sides of the tension band 96. Tongues 106 and 108 extend away from members 80 and 82 due to the curvature of tension band 96 as shown in FIG. 6. Tongue 108, in the initial position of the roller-band G-switch, rests against the end of adjusting screw 110 which is threaded through end wall 92. The position of members 80 and 82 in the guideway may be adjusted by screw 110 so as to position the contact line of member 80 and tension band 96 along the desired portion of the triangular portion or negative spring constant of cutout 100.

Tongue 106 is positioned on tension band 96 so that the tongue contacts the flat contact 112 when the roller-band device is in its final position in the same manner as block 78 in FIG. 5. Electrical leads are connected as shown to screw 98, screw 110 and contact 112 to provide an initial closed circuit between screw 98 and screw 110 and an initial open circuit between screw 98 and contact 112. It will be apparent that walls 84 and 86 may be either made of or coated with an insulating material (not shown). In the roller-band device's final position, there will be a closed circuit between screw 98 and contact 112.

In FIG. 8, the resulting force bias created by cutouts 100 and 101 and tongue 106 is shown by the solid line 114. The force bias generated by cutout 100 includes dotted line 116 and the negative spring constant portion of line 114 as well as the constant positive return force portion of line 114. Cutout 101 generates the negative force bias or latching force portion of line 114 designated by 118. Tongue 108 generates a pushing force against the rotatable members, shown by dotted line 120 so as to insure a clean breakaway from the initial position after long term storage. This compliant stop forces the rollers to roll forward a small amount from the initial position to reach the breakaway force level. The negative spring constant insures a snap action release.

When the roller-band switch is accelerated in the direction of the arrow a force or "set-back" is experienced in the opposite direction. If the force is sufficient to overcome the rolling friction force ($F_t$ from Equation 2) the rotatable members and tension band may begin to roll from their initial position determined by screw 110 and compliant tongue 108. If the force continues and is greater than the force bias generated by cutout 100, the rotatable members and tension band may continue to roll down the guideway. If the force is maintained for a time exceeding the time necessary for the rotatable members and tension band to traverse the guideway so that the contact line between member 80 and wall 84 is past cutout 100 and the contact line between member 82 and wall 86 is over cutout 101, the roller-band switch may be locked in position with tongue 106 in contact with electrical contact 112. If the force is not maintained for the necessary time, the force bias generated by cutout 100 may reset the roller-band device to its initial position.

A roller-band device has inherent directional sensitivity along the longitudinal axis of the guideway. The device is relatively insensitive to extraneous side loads or forces because of the counteracting balanced forces between the tension band and rotatable members in the direction of the normal forces (N) so that for side components of force perpendicular to the roller axes but less than N the total resultant normal force on both surfaces is constant and only small changes in $\mu$ associated with the nonlinearity of $\mu$ versus load are experienced. This normal force creates friction between the members, tension band and guideway which acts to prevent such force components parallel to the roller axes from displacing the rollers laterally which is also aided by the band's side stiffness. Lateral motion may be substantially eliminated by positioning blocks or guides 122 (FIG. 7) along the periphery of members 80 and 82 on sidewalls 88 and 90. Since the guides 122 are along the periphery of members 80 and 82 at the position of lowest relative velocity between each member and the guides, the sliding friction introduced may be kept minimal.

If rollers with equal mass moments of inertia are used they will not respond to rotational acceleration components about the roller axes. It will be apparent that the switch may be modified to be sensitive to rotational acceleration components about the roller axes by using rotatable members having different inertias.

FIG. 9 illustrates a roller-band switch or accelerometer which has been modified to measure both a G-level and velocity change. The roller-band device includes a first pair of adjacent rotatable members 124 and 126 held under tension in an initial position as shown between guideway supporting walls 128 and 130 and end walls 132 and 134 by a first tension band 136. Member 126 may be provided with an orifice 138 passing through the center thereof and aligned with an opening 140 in band 136. The roller-band device also includes a second pair of adjacent rotatable members 142 and 144 held under tension as shown adjacent to member 16 by a second tension band 146. Tension bands 136 and 146 may be fastened under tension in an overlapping manner as shown by suitable fastening means at the extremities of each band.

Tension band 146 may be provided with suitable force biasing such as that shown in FIG. 8 with cutout 100 and tongue cutout 102, leaving tongue 106, in the same manner as tension band 96 in FIG. 8. Members 142 and 144 operate in the same manner as members 80 and 82 in the switch shown in FIGS. 6 and 7, responding to forces in the direction of the arrow. The force level at which the members respond may be selected by means of adjustment screw 148. The force biasing in tension band 146 holds both sets of rotatable members in the initial position. Tension band 136 may have uniform width dimension throughout its length similar to tension band 52a in FIG. 4a.

The interior 149 of the guideway may be filled with a suitable damping fluid, liquid or gas. Members 124 and 126 and tension band 136 are preferably closely dimensioned to that of the side walls so as to limit gas leakage around the ends thereof and the side walls shaped to provide guide rail type surfaces to prevent excessive side friction while members 142 and 144 and tension band 146 are loosely dimensioned to allow substantially undamped movement.

When the roller-band device is subjected to a predetermined or preselected acceleration to the left, members 142 and 144 and tension band 146 may roll to the end of the guideway adjacent to end wall 134 with tongue 106 engaged or locked in ledge or shelf 150 in wall 134. Simultaneously, members 124 and 126 and tension band 136 may begin to roll in the same direction since there is no force biasing holding the rotatable members and tension band in their initial position. The rate at which members 124 and 126 roll along the guideway is dependent on the rate of flow of the damping fluid or gas through orifice 138 and opening 140 thus integrating the acceleration force with respect to time. Suitable electrical contacts may be provided on the guideway and tension bands to indicate the G-level sensed by members 142 and 144 and tension band 146 and the velocity change measured by members 124 and 126 tension band 136.

The roller-band device may be reset to its initial position by forcing or pushing tongue 106 off ledge 150 with screw 152.

FIG. 10 illustrates a roller-band accelerometer or G-switch may sense one or more G-force levels. The switch shown in FIG. 10 includes a pair of adjacent, spool-shaped rotatable members 154 and 156 held under tension between guideway supporting walls 158 and 160 and end walls 162 and 164 by tension band 166.

Tension band 166 may include a rectangular cutout 168 as shown, similar to cutout 60b in FIG. 3b along a substantial portion of the band leaving a pair of outer band portions which supports members 154 and 156 their respective rim portions 170 and 172. Since the outer band portions have equal dimensions at each contact line, the tension band does not contribute force biasing to the switch. The tension band may be fastened with suitable fastening means at diagonally opposing ends of the guideway as discussed previously. The band may be fabricated with separate longitudinally oriented and insulated conductors (not shown) (see FIG. 4a) along each outer portion by conventional laminating techniques and the band folded around the outside of end wall 164. An output contact 174 (shown with exaggerated thickness) may be provided on the outer portion of band 166 and a contact (not shown) disposed to the right and spaced longitudinally from contact 174 on the other outer band portion. The conductors may be interrupted along the portion of the tension band folded around end wall 164 to provide two sets of conductors which when connected together by the action of the switch may form separate complete circuits with a measuring or utilization means (not shown) which may be connected to the exposed interrupted conductors in a conventional manner. For instance, the portion of the tension band folded around end wall 164 may be plugged directly into a suitable connector or circuit board and thus make contact with the interrupted conductors and complete the circuit with the measuring means.

Since the rollers appear to be rolling generally about the contact lines at any given point along the guideway, displacement or forces may be amplified or decreased infinitely in a mechanism by coupling or connecting the mechanism to any point on any radius of the roller, either above or below the roller axis and either within or without the roller diameter, depending on the desired result. Thus, a tension spring 178 may be fastened between the rims of rotatable member 156, as shown, and end wall 162 so as to decrease spring displacement and effectively lengthen the spring. The spring may be fastened to an initially smaller radius of the rotatable member (such as a chordal cutout in the outside circumference leaving a substantial surface of the original circumference) which radius is increased as the rotatable member rolls so as to effect increased displacement of the spring at the beginning of motion and allow the spring to be stored at relatively low tensions. Tension spring 178 preferably has a linear positive spring constant. Spring 178 may be fastened to end wall 162 with suitable adjusting means so as to enable the adjustment of the proper spring tension along the force bias curve. An adjustable breakaway force level may be provided by adjusting screw 180.

As the switch shown in FIG. 10 is subjected to an increasing force in the direction of the arrow which exceeds the preselected breakaway force, the rotatable members and tension band may roll along the guideway. As the members and band continue to roll, the tension spring is stretched, increasing the force bias applied to member 156. It the force level does not continue to increase, the members and tension band may reach a stable balanced position of rest or they may return to the intital position. If the force level increases sufficiently, the rotatable members and tension band will roll over electrical contacts 174 and 176 at preselected force levels and initiate the measuring or utilization circuits.

The tension spring and the positions of contacts 174 and 176 may be adjusted and calibrated by conventional standard weight techniques.

Figure 11:
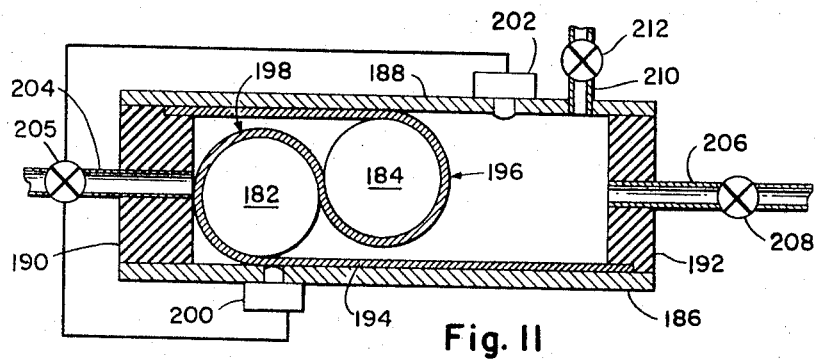
FIG. 11 is a cross-sectional side view of the present device as it may be used to pump fluids.

FIG. 11 illustrates a roller-band device which may function as a substantially frictionless piston in a fluid pump. The roller-band device in FIG. 11 includes a pair of adjacent rotatable members 182 and 184 held under tension in an initial position between guideway supporting walls 186 and 188, end walls 190 and 192 and side walls (not shown) by tension band 194. Tension band 194 preferably has a return force type force bias such as shown in FIG. 3b. In order to provide this force bias, the portions 196 and 198 of tension band 194 which partially encompass 182 and 184 may be preformed by cold forming tension band 194 in a generally S-shape with portion 196 having a greater radius of curvature than portion 198.

The travel of members 182 and 184 and tension band 194 from one end of the guideway or to the other may be sensed by suitable electrical contacts or by microswitches 200 and 202 as shown.

For this embodiment, it is preferable that the rotatable members and tension band be dimensioned as closely as possible to the inside dimensions of the side walls so as to form two chambers 201 and 203 on either side thereof and to prevent fluid or gas leakage around the ends thereof. Typical spacings may be between 0.0002 and 0.003 inch. A pressurized driving medium may be coupled to chamber 201 through end wall 190 by fluid inlet 204 which may be controlled or valved by switches 200 and 202 and valve 205. Valve 205 may be any suitable multiposition valve which in one position may pass driving fluid (either liquid or gas) into chamber 201 and in a second position may close off inlet 204 and vent chamber 201 to ambient pressure. End wall 192 includes a pumping fluid or gas outlet 206 which may be controlled or valved with a suitable pressure release or check valve 208. Wall 188 includes a pumping fluid or gas inlet 210 which may be controlled or valved with a suitable pressure sensitive or check valve 212.

Assuming that the roller-band device in FIG. 11 is in its initial position, as shown, that valve 212 is open allowing pumping fluid or gas into chamber 203, that switch 200 is energized which in turn has opened valve 205 to driving fluid inlet 204 and that switch 202 is deenergized. As the driving fluid enters and fills chamber 201, rotatable members 182 and 184 and tension band 194 may be driven down the guideway deenergizing switch 200. As the members and band travel down the guideway, the pressure in chamber 203 is increased closing pressure sensitive valve 212 and opening valve 208 allowing the pumping fluid to pass through outlet 208. When the members and band reach the end of the guideway, switch 202 may be energized thus opening valve 205 to ambient pressure allowing the driving fluid or gas to escape from chamber 201. Tension band 194 may then drive the members and band back to their initial position lowering the gas or fluid pressure in chamber 203, thus closing valve 208 and opening valve 212. Switch 202 may be turned off and switch 200 turned on starting the pump stroke again.

The device shown in FIG. 11 may also be used as a piston in an engine, actuator or shock absorber.

Figure 12:
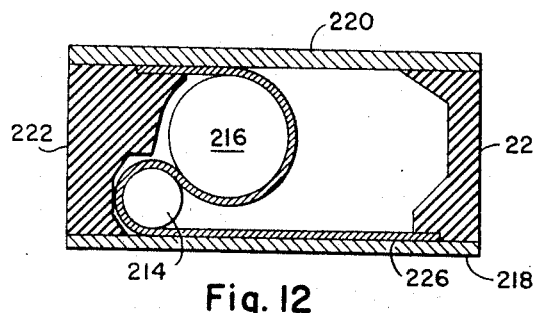
FIG. 12 is a cross-sectional side view of the device utilized as a speed converter.

FIG. 12 illustrates a roller-band device having unequal diameter rotatable members. The device includes a pair of adjacent rotatable members 214 and 216 held under tension between guideway supporting walls 218 and 220 and end walls 222 and 224 by tension band 226. Tension band 226 may have any desired force biasing and the relative sizes of members 214 and 216 may be selected depending on the particular application of the device.

As the rotatable members and tension band roll along the guideway, member 214 may turn at a greater rate of speed than that of member 216 depending on the ratio of the diameters of the members. Roller band devices have been constructed with speed change ratios as high as 200 to 1.

A doubly integrating accelerometer may be provided by rigidly attaching a pair of large diameter flywheels (not shown) to member 214 using the inertia of the flywheels as an integrating force so that the linear motion of the members and tension band represent the motion of a carrying vehicle. This device may also act as a rack and pinion wherein one member functions as a rack and the other functions as a pinion.

Figure 13:
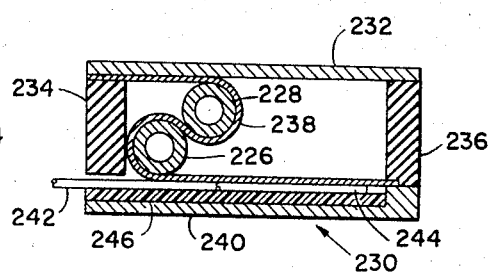
FIG. 13 is a cross-sectional side view of a roller-band electrical potentiometer embodying the present device.

FIG. 13 illustrates a roller-band device which may function as an electrical potentiometer and function generator. The device shown includes a pair of hollow rotatable members 226 and 228 held under tension between guideway supporting walls 230 and 232 and end walls 234 and 236 by tension band 238. Tension band 238 may have any desired force biasing depending on the particular application of the potentiometer or function generator. Wall 230, in this embodiment includes an outer guideway wall 240, a first resistance wire 242 and a second resistance wire 244 laterally disposed from resistance wire 242, and an insulating layer 246 separating the resistance wires from wall 240. Tension band 238, which may be made of a suitable electrical conductive material, rolls directly along resistance wires 242 and 244. Resistance wires 242 and 244 may be connected to a suitable power source (not shown) and utilization means (not shown).

As the rotatable members and tension band roll along the guideway, tension band 238 acts as a moving electrical short at its contact line with the resistance wires, thus establishing a varying resistance loop.

If one or both of the resistance wires 242 and 244 is bent or curved with respect to the other wire, the linear movement of tension band 238 along the resistance wires may generate any arbitrary function of resistance with respect to time or other variables linked to roller displacement.

It will be apparent that one or the other of the wires 242 or 244 may be a good conductive material and that one wire may be placed along each guideway supporting wall rather than on the same wall as shown.

Figure 14:
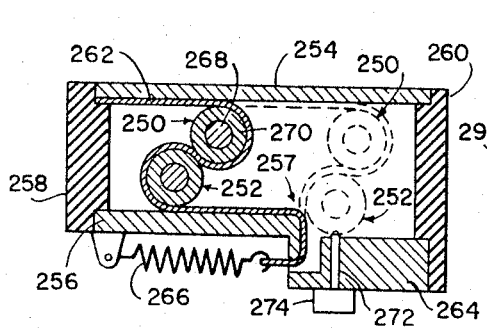
FIG. 14 is a cross-sectional side view of the roller-band device utilized as a force amplifier.

FIG. 14 illustrates a roller band force amplifier or impacting device which is capable of producing large normal forces from a given input force. The device includes a pair of adjacent rotatable members 250 and 252 held under tension in an initial position as shown between an upper guideway supporting wall 254 which extends the entire length of the device, a first lower guideway supporting wall 256 which extends along only a portion of the length of the device and end walls 258 and 260 by a tension band 262. A second lower guideway wall 264, which is separated from wall 254 by a greater distance than wall 256, extends from the end of wall 256 the remaining length of the device to end wall 260. The end portion 257 of wall 256 thus provides an abrupt or step increase in guideway supporting wall spacing.

Tension band 262 may be fastened at one end to upper wall 254 adjacent end wall 258 and the other end bent around end portion 257 of wall 256 and fastened to tension spring 266. Tension spring 266 may be fastened at its free end to a convenient fixed point such as the outside of wall 256. Tension spring 266 introduces the necessary tension forces to tension band 262. Tension band 262 may include suitable force biasing, such as described above, depending on the application of the device.

The diameters of rotatable members 250 and 252 are selected so that their combined diameters is at least slightly greater than the distance between walls 254 and 264 (the closer the dimension, the higher the force amplification). The rotatable members may be a solid or hollow cylinder but in order to decrease any inertial delays from the "flywheel effect," the members, as shown with respect to member 250 may be made of a heavy center core 268 concentrically surrounded by a lighter tubular member 270. Core 268 may be made of a material such as a sintered tungsten alloy while member 270 may be made of a material such as aluminum.

When the rotatable members and tension band are subjected to a force, such as a G-force, in the direction of the arrow, the members and band travel down the guideway between walls 254 and 256. When member 252 reaches end portion 257 and sees the step increase in wall spacing, the force in tension band 262 provided by the spring force in tension spring 266 may be imparted to member 252 as kinetic energy. Member 250 is pulled back to the position shown by dotted lines and member 242 impacts on wall 264. In addition to the very large direct mechanical advantage achieved by the spring combination and nearly vertical disposition of the rollers at impact, this device also makes it possible to recover the very high forces associated with the substantially instantaneous stopping of the rollers. Substantially all the kinetic energy imparted to the rollers is recovered as the rollers impact and are locked in place by friction.

A firing pin 272 and detonator 274 may be positioned on wall 264 aligned with member 252 so that the impact of member 252 may fire the detonator. The detonator may be operably connected to some utilization means such as an explosive, a pyrotechnic in a thermal battery or the member could perform directly some mechanical function such as forming or shearing materials.

Figure 15:
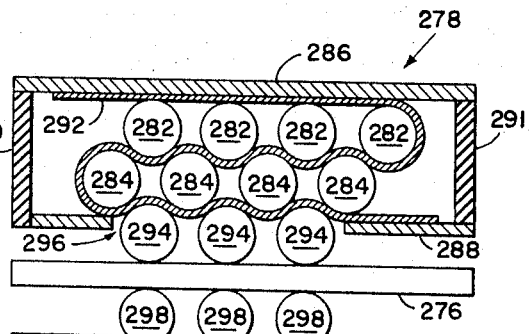
FIG. 15 is a cross-sectional side view of a heavy load-bearing roller-band device.

FIG. 15 illustrates a mechanism for supporting heavy loads using a plurality of groups of rotatable members. As shown in FIG. 15, a load 276 may be supported between a pair of roller-band devices 278 and 280. Since each device is essentially identical, only device 278 will be described in detail.

In device 278, a plurality of groups of rotatable members, each group including a pair of adjacent rotatable members 282 and 284, may be held under tension between guideway walls 286 and 288 and end walls 290 and 291 by a tension band 292. Tension band 292 may be fastened at either end to walls 286 and 288 in the same manner as described above after being threaded around each of the members 282 and 284 of each pair as shown in a generally S-shaped configuration. A group of idler rollers 294 may then be inserted between tension band 292 and the load 276 adjacent and between members 284 in slot 296 in wall 288.

The load is supported between devices 278 and 280 by a second group of idler rollers 298 in a similar slot in device 280.

Any number of groups of rotatable members may be used depending on the size of the load. Additional load bearing capability may be obtained by using one or more additional rows of rotatable members aligned with each group shown of members 282 and 284 and reverse looping the tension band along each row in the same manner as shown as long as the summation of diameters of the rotatable members in any one group is greater than the distance between the supporting walls 286 and 288.

Figure 16:
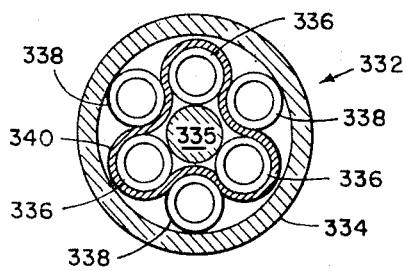
FIG. 16 is a side elevation view, partially in cross-section, of a roller-band device using a curved or arcuate guideway and right circular cylinder rotatable members.

The device 332 shown in FIG. 16 includes a guideway having an outer tubular member or wall 334 and an inner concentric circular member or wall 335, which may be a cylinder as shown. A plurality of groups of rotatable members, each group including a pair of adjacent rotatable members 336 and 338, is positioned within the guideway formed by walls 334 and 335 and held in place by continuous tension band 340. Tension band 340 is held under tension and away from walls 334 and 335 by the restraining force created between the rotatable members and the guideway walls. Each rotatable member is shown as a hollow cylinder.

Roller-band device 332 may be a bearing used to support a rotating shaft represented by circular wall 336 of the guideway. Since tension band 340 maintains the axes of the rotatable members in parallel, the normal end effects and losses in conventional roller bearings is obviated. Further, since there is little or no relative motion between contiguous parts of the roller-band device, the device substantially exhibits only pure rolling motion.

The roller-band devices shown in FIGS. 6-14 above may be easily constructed using microminiature modular techniques by making a wide range of devices with the same general modular components. These devices may use a guideway formed from stock extruded square tubing having cross section dimensions of about .25 x .25 inch and lengths from about .312 to 1.250 inches with an average volume of about 0.5 cubic inch. Rollers may be fabricated having diameters ranging from .115 to .205 inch which may then be paired to perform any desired function. Some rollers may be bored with a standard orifice as shown in FIG. 9 which may then be fitted with conventional obstructions to create a desired leakage and damping. Standard force bias type tension bands (see FIG. 3) and multiple conductor bands (see FIG. 4) may be produced and desired force biasing applied by photographic etching or other conventional techniques.

These devices may be built to operate from a breakaway force between about .002 G to 7,000 G and measure G-seconds over a range of from about .25 G-second to 200 G-seconds. The devices may also perform a wide range of functions or detect a complex force pattern and generate multiple indications thereof within an extremely small package and with a relatively small number of parts.

A roller-band device may operate at substantially lower friction than comparable devices under the same operating conditions (in some cases having a coefficient of friction as low as .0001). Thus under many extreme operating conditions where lubricants can not normally be used, the devices can operate with a minimum of wear and friction. If it is desired and conditons permit, lubricants may be used to decrease still further the rolling friction losses.

Because these devices exhibit exceedingly low coefficients of friction and may substantially eliminate surface roughness losses which in many instances where used in prior condition sensing devices to effect good electrical contacts, these devices may employ high normal forces between electrical contacts without seriously degrading accuracy of the device.

While for purposes of illustration various features are shown in different views, it will be clear that the majority of features may be embodied into a single device. It will also be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A device of the class described comprising the combination of a housing including spaced apart walls, a plurality of rotatable members intermediate said walls and movable longitudinally thereof having a combined cross-sectional dimension greater than the spacing between said walls, and a flexible band looped in a generally S-shaped fashion about adjacent rotatable members, said band having a portion secured to the housing and disposed adjacent one of said walls and having another portion secured to the housing and disposed adjacent the other of said walls for rolling movement of said rotatable members and said band longitudinally along the housing with adjacent rotatable members turning in opposite directions.

2. The device of claim 1 including means urging said rotatable members longitudinally of said housing.

3. The device of claim 2 wherein said flexible band has a portion of varying cross-sectional dimension.

4. The device of claim 3 wherein said flexible band has a portion intermediate the sides thereof removed.

5. The device of claim 1 wherein said flexible band is provided with a portion of preformed curvature.

6. The device of claim 1 wherein there is provided yieldable means for urging said rotatable members toward an initial position.

7. The device of claim 1 wherein at least one of said rotatable members includes an exterior non-circular portion.

8. The device of claim 1 wherein said rotatable members have a generally cylindrical exterior.

9. The device of claim 8 wherein said rotatable members are provided with end portions of diameters different than centrally disposed portions thereof.

10. The device of claim 8 wherein said rotatable members have centrally disposed portions of differing diameters.

11. The device of claim 8 wherein there are provided a plurality of groups of rotatable members, each group including at least one pair of rotatable members.

12. The device of claim 1 wherein there is provided a damping fluid within said housing.

13. The device of claim 12 wherein one of said rotatable members includes an orifice diametrically disposed across said rotatable member aligned with an opening in said band.

14. The device of claim 1 wherein said walls are generally parallel to each other.

15. The device of claim 1 wherein the walls of one portion of said housing are spaced apart a greater distance than other portions thereof.

16. The device of claim 1 wherein a projection extends into the path of movement of at least one of the rotatable members for positioning the rotatable member.

17. The device as claimed in claim 1 wherein said housing is provided with an orifice through which fluid is adapted to be transferred in response to movement of the rotatable members.

18. The device as claimed in claim 1 wherein there is provided an electrical contact adapted to be actuated in response to movement of the rotatable members.

19. The device of claim 18 wherein said electrical contact is adapted to move along a resistance material.

20. The device of claim 18 wherein said electrical contact is provided by a plurality of electrical conductors embedded within said flexible band.

21. A device of the class described, comprising a plurality of adjacent rotatable members, a guideway having spaced apart walls supporting, guiding and restraining said rotatable members, said walls being spaced from each other a distance less than the summation of the diameters of said rotatable members, flexible band means supported under tension between said walls, said band means having a portion disposed between and partially encompassing adjacent rotatable members in a generally S-shaped fashion for maintaining said members with axes parallel and providing rolling motion between said members and said band means and between said members and said walls, said adjacent rotatable members turning in opposite directions.

References Cited

FOREIGN PATENTS 526,230   5/1931   Germany.

MARTIN P. SCHWADRON, *Primary Examiner.*

L. L. JOHNSON, *Assistant Examiner.*

U.S. Cl. X.R.

73—514; 103—1, 149; 184—29; 200—34, 52, 81, 166; 267—1; 274—4; 308—6, 202, 209; 340—174.1

UNITED STATES PATENT OFFICE
CERTIFICATE OF CORRECTION

Patent No. 3,452,175                                                June 24, 1969

Donald F. Wilkes

It is certified that error appears in the above identified patent and that said Letters Patent are hereby corrected as shown below:

Column 9, line 5, "In" should read -- If --. Column 18, line 27, after "Referencec Cited" insert --

UNITED STATES PATENTS

| | | | |
|---|---|---|---|
| RE. 15,345 | 4/1922 | Robson | 308-217X |
| 173,215 | 2/1876 | Doremus | 103-149 |
| 2,033,141 | 3/1936 | Kraut | 308-5X |
| 2,733,069 | 1/1956 | Frost | 242-55.14 |
| 2,959,057 | 11/1960 | Winker | 73-516 |
| 3,167,962 | 2/1965 | Scotto | 73-515X |
| 3,251,627 | 5/1966 | Fisher | 242-107 |
| 3,344,675 | 10/1967 | Hellen | 73-517 |
| 3,396,328 | 8/1968 | Yuan | 73-517X | same column 18, after "FOREIGN PATENTS" insert 542,961    1/1932    Germany

Signed and sealed this 30th day of June 1970.

(SEAL)
Attest:

EDWARD M. FLETCHER, JR.                      WILLIAM E. SCHUYLER, JR.
Attesting Officer                                 Commissioner of Patents